March 1, 1932. D. COLE 1,847,817
LUBRICATING SYSTEM
Filed Dec. 18, 1918 2 Sheets-Sheet 1

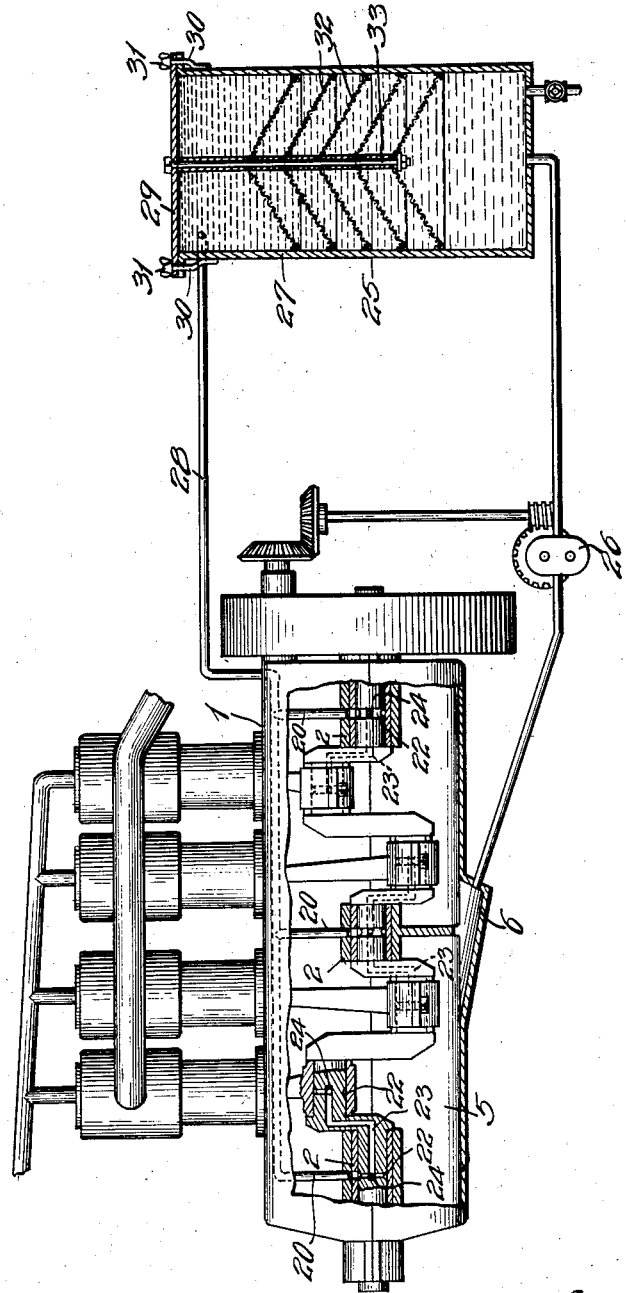

Patented Mar. 1, 1932

1,847,817

UNITED STATES PATENT OFFICE

DON COLE, OF CHICAGO, ILLINOIS, ASSIGNOR, BY DIRECT AND MESNE ASSIGNMENTS, TO DOOLEY IMPROVEMENTS, INC., OF ROCK ISLAND, ILLINOIS, A CORPORATION OF ILLINOIS

LUBRICATING SYSTEM

Application filed December 18, 1918. Serial No. 267,256.

My invention relates to improvements in lubricating systems and has special reference to an improved lubricating oil system for internal combustion engines.

In the operation of many machines which include pressure lubricating systems, the lubricating oil is drawn from an oil sump in the base of the machine by a pump which forces the oil under pressure to the several bearings of the machine. Such systems do not provide any adequate means for filtering the oil and thus freeing it from the accumulation of foreign matter such as metallic particles and sand, nor do they provide adequate means for separating the oil from any water which accumulates with the oil.

The importance or value of my invention will be appreciated when it is considered, as well known, that internal combustion engines, though well adapted otherwise for use on farm tractors, have so far not proven durable or trustworthy because cylinders, pistons and bearings soon grind out, due to the large quantities of sand and grit which are accumulated in the operation of the engine. This sand enters the engine from the clouds of dust raised in operation, through the carburetor, the manifold and the breather pipe, as well as through the various oiling holes. The grit thus taken into the engine is gradually washed down into the base by the lubricating oil and is carried back again by the oil to the various wearing surfaces of the engine. In engines in which the splash system of oiling is used, continual agitation of the body of the oil keeps the sand in suspension and it is thrown upon the cylinder surfaces and carried to and through the bearings. In engines which are equipped with pressure feed lubricating systems, the oil pump draws the oil with the grit therein from the base of the engine and forces it to and upon the bearings.

By means of my improved system of lubrication and filtration I am enabled to continuously wash away and remove the accumulation of sand and thus preserve the lubricating oil practically free from all grit. This, of course, enures to the benefit of the user, as it is possible, by the application of my invention to extend the life of internal combustion engines for farm tractor use, almost indefinitely.

In my improved system I provide an associated oil filter to which I continuously pump the oil from the engine and from which I continuously pump or force the oil under pressure, after filtering, to the several points of delivery, i. e., the bearings to be lubricated.

I am thus enabled to provide filtering means of ample capacity to preserve the lubricating oil in the best condition, to continuously in effect wash the whole interior of the engine with clean oil, to continuously remove from the engine the intaken sand, and at the same time to force the oil to the bearings in sufficient quantity and at sufficient pressure to cause them to be thoroughly flooded with oil.

In one form of my invention I am enabled to combine a low pressure filter in which the oil is filtered slowly with a high pressure oil delivery means, thus providing a system best adapted to deliver the oil in the best possible condition to the bearings and in ample or even excessive quantity.

To accomplish my purpose I provide a pump or pumping means for withdrawing the used lubricant from the base of the machine, or the oil sump, and delivering it to a filter and I provide means for returning the filtered oil back to the engine or machine, under pressure.

I may use a gravity filter of ample capacity, using one pump for delivering the oil to the filter and another for drawing it from the filter and delivering it to the engine, or I may use a pressure filter and by means of a single pump draw the oil from the base of the engine force it to and through the filter and from the filter back to the bearings of the engine, but in each instance I maintain a closed system of forced feed lubrication, which includes a filter arranged separate from the engine and of ample capacity to meet the conditions and by which I am enabled to continually withdraw the dirty gritty oil from the engine and continuously wash the interior of the engine and bearings with clean oil.

My invention will be more readily understood by reference to the accompanying drawings, which portray, in diagrammatic form my improved lubricating system, as developed for internal combustion engines, and in which:—

Figure 2 illustrates the pressure filter system.

Figure 1:
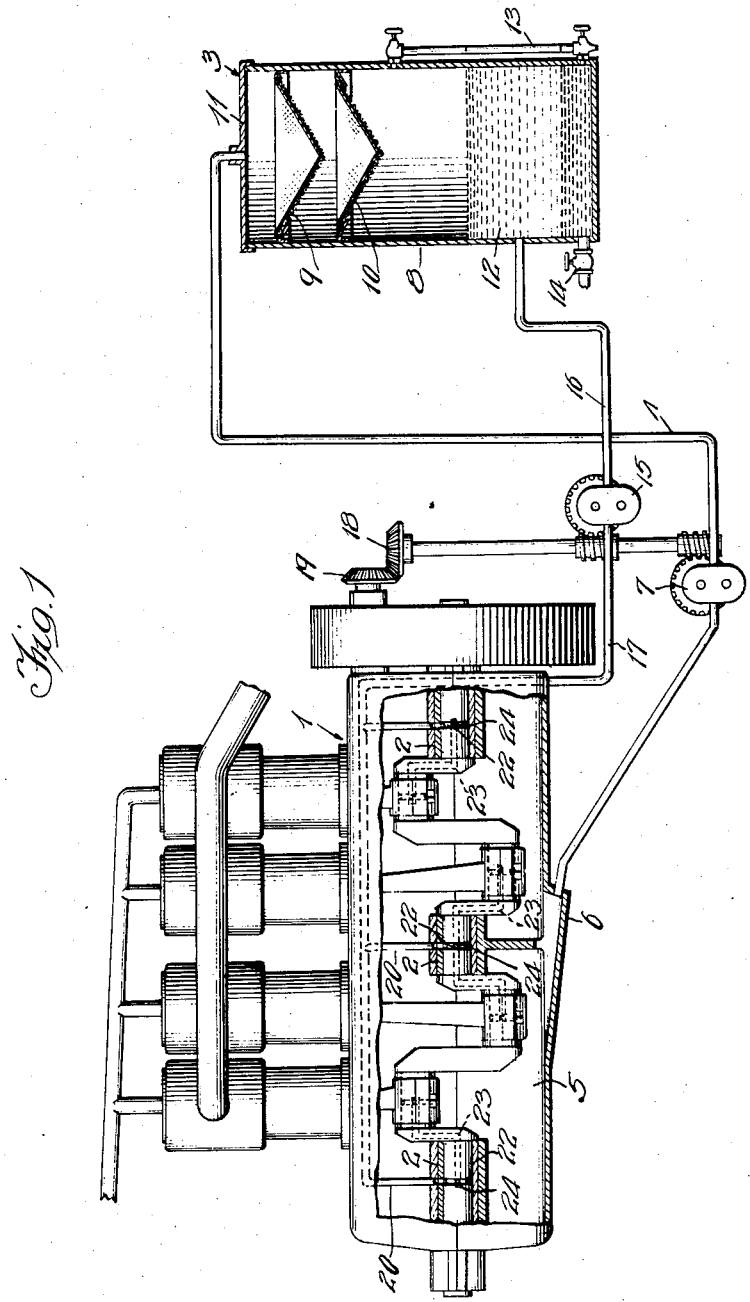
Figure 1 illustrates the gravity filter system.

In said drawings 1 represents a machine to be oiled,—in this instance an internal combustion engine adapted for automobile and similar use, and 2—2 are the several crank shaft bearings to which the oil is to be supplied. I provide a suitable gravity oil filter 3 of sufficient capacity so that the oil will not have to be forced through the filter in order to filter it fast enough to supply a sufficient quantity for the force feed system.

I connect the top of the filter by a pipe 4 with the base 5 of the engine, preferably providing the base with an oil sump or oil collecting well 6 to which the pipe 4 connects. I interpose in the pipe 4 an oil pump 7 of any suitable design and adapted, when operated, to draw oil from the base of the engine and deliver it to the top of the filter. The filter 3 may be of any suitable construction, and I have shown it as having a metal casing 8 in the upper part of which I arrange two coned filter partitions 9 and 10, carrying suitable filtering material and through both of which the oil must pass to reach the bottom of the casing. I preferably make the cover 11 of the filter removable and also arrange the filter partitions 9 and 10 so that they can be readily removed from time to time to be cleaned or renewed.

The lower part 12 of the casing 8 constitutes an oil storage space in which the clean filtered oil accumulates after it has passed through the filter partitions. This lower part 12 also constitutes a separator in which the oil separates from any water carried with it, and I provide a glass sight tube 13 attached at its ends to the casing 8 and adapted to indicate or show the depth of oil and water in the filter. I also provide a drain valve 14 at the bottom of the filter by which the water, which may accumulate, may be withdrawn from time to time.

I connect the lower part of the filter to a pressure pump 15 by a pipe 16. I preferably connect the pipe 16 with the filter above its lower end to provide a space below the point of connection for the accumulation of water and in which space the filtered oil is substantially quiescent so that it may best separate from any contained water. I connect the delivery side of the pump 15 by means of a delivery pipe 17 to the engine, branching the pipe 17 to the several bearings so that the pump 15 will deliver oil under pressure to all of the bearings.

The capacity of the pressure pump 15 relative to the several delivery openings at the bearings is such that the oil is delivered at a relatively high pressure to the bearings, and in order to prevent any accumulation of the oil in the base of the engine I preferably make the drain pump 7 of slightly greater capacity than the maximum delivery of the pressure pump. This arrangement of pumps prevents the grit which has been washed down from being carried back to the bearing surfaces by splashing.

The return oil pipe 17 as shown is provided with branches 20 to deliver oil to the several stationary bearings 2. To deliver the oil to the crank pins I provide a circumferential groove 22 within each bearing in the shaft and I provide a passage 23 leading through the shaft and crank arm and ending at the surface of the crank pin. A radial hole 24 in the shaft connects the groove 22 with the passage 23. The pressure of the oil as delivered through the pipe 17 and branch pipe 20 is sufficient to force the oil into the shaft through the radial hole 24 and the oil flows in a steady stream to the several crank pins from the several bearings. The oil works out through the ends of the crank pin bearings and is thrown from the crank pins upon the cylinder walls and the interior surfaces of the engine base and thus effectually washes all grit thereon down into the base and into the oil sump.

In Figure 2, 25 is a pressure filter and in this form of my invention I employ a single pump 26 which I arrange between the engine and the filter for drawing the oil from the sump 6 of the engine and in this instance forcing the oil into the bottom of the filter. The oil rises and fills the filter casing 27 and is forced back to the engine through the return pipe 28 which connects the upper end of the filter to the engine.

The lubricating system as in the first form, is a closed circuit or system, which includes the base of the engine, and in each instance the system includes the relatively large filter through which the oil can flow relatively slowly. The pressure filter 25 which I use comprises the cylindrical casing 27, closed at its top by the removable cover 29. I make the casing pressure tight at its top by securing the cover upon the casing with the tie bolts 30 and nuts 31. The filtering partitions or walls comprise a plurality of cones 32 arranged in nested relation within the casing and carried by a central rod or bolt 33 secured to the cover 29 so that the cones will be lifted out of the casing with the cover for cleaning purposes. Preferably the cones are arranged with their smaller ends up so that the sand or grit filtered out will spread to the largest diameter thereof and thus have a minimum clogging effect.

It should be understood that the illustrations are typical merely of my invention and that the same may be embodied in many different forms without departing from the scope of the appended claim.

I claim:

In a lubricating system for an automotive engine containing a body of oil exposed to contamination by deleterious solids, means to circulate the oil to the parts to be lubricated and to a filter casing, and a fine texture filter in said casing having an area and capacity so correlated to the size of the system and the contaminating conditions under which the system is used as to remove said deleterious solids at a rate substantially equal to the rate of contamination of said oil by said deleterious solids.

In witness whereof I hereunto subscribe my name this 12th day of December, A. D. 1918.

DON COLE.